Aug. 6, 1946.  G. T. JARRETT  2,405,357
FRICTION CLUTCH
Filed Dec. 13, 1944  2 Sheets-Sheet 1

INVENTOR.
George T. Jarrett
BY
Bodell & Thompson
ATTORNEYS

Aug. 6, 1946.   G. T. JARRETT   2,405,357
FRICTION CLUTCH
Filed Dec. 13, 1944    2 Sheets-Sheet 2

INVENTOR.
George T. Jarrett.
BY
Bidwell & Thompson
ATTORNEYS

Patented Aug. 6, 1946

2,405,357

UNITED STATES PATENT OFFICE 2,405,357

FRICTION CLUTCH

George T. Jarrett, Syracuse, N. Y., assignor to Lipe-Rollway Corporation, Syracuse, N. Y., a corporation of New York Application December 13, 1944, Serial No. 567,971

9 Claims. (Cl. 192—68)

This invention relates to friction clutches of the type used in automotive vehicles and embodying clutch levers for transmitting the movement of the throw-out collar to disengage the clutch against powerful spring means holding the clutch engaged, and has for its object a simple and economical lever construction and arrangement by which the levers are readily assembled in the clutch without pivot and fulcrum pins and bearings and anologous fastening devices, and also an arrangement of springs for holding the levers from displacement off their fulcrums, preventing vibration or rattling and also causing the levers to follow up automatically as the friction faces of the clutch wear.

The invention consists in the novel features and in the combinations and constructions hereinafter set forth and claimed.

In describing this invention, reference is had to the accompanying drawings in which like characters designate corresponding parts in all the views.

Figure 1:
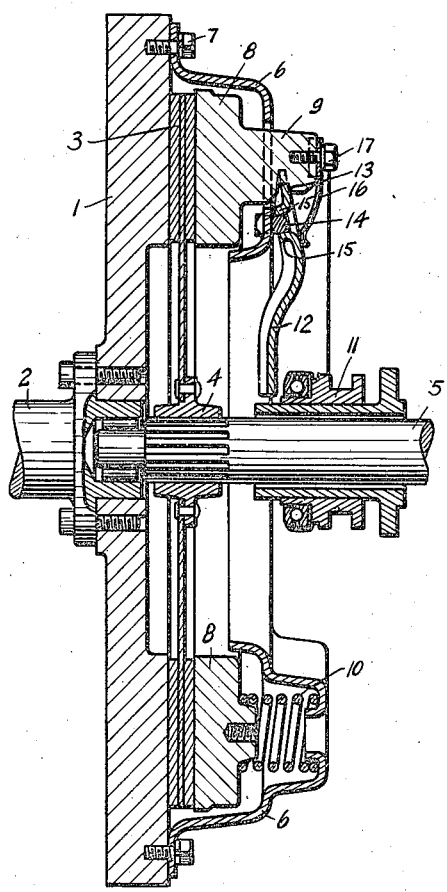
Figure 1 is a sectional view taken on line 1—1, Figure 2.
Figure 2:
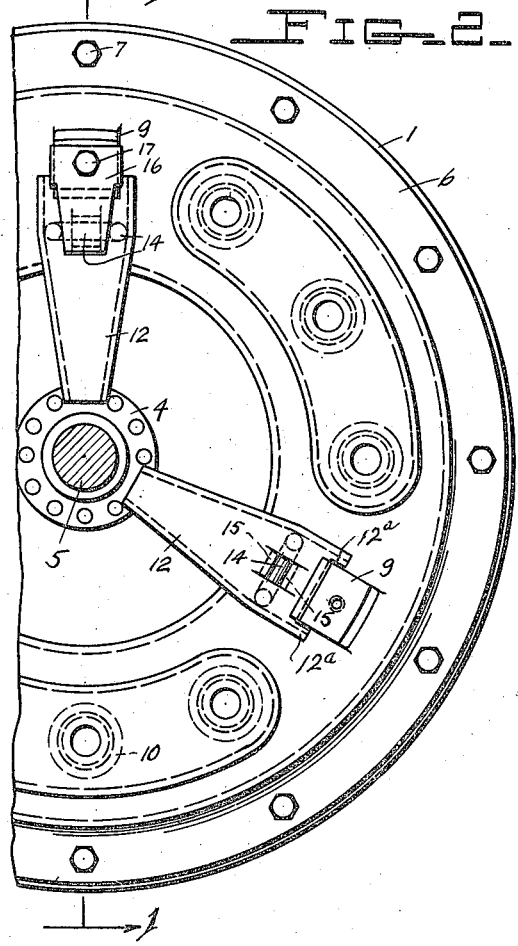
Figure 2 is a fragmentary rear elevation of parts seen in Figure 1.

1 designates the driving member of a clutch, which is usually the flywheel of the engine of the vehicle mounted on the crankshaft 2 of the engine. 3 designates the driven member, here shown as a friction clutch plate having a hub 4 slidably splined on the clutch shaft 5. 6 is the back plate secured, as by screw bolts 7, to the rim of the flywheel 1. 8 is the pressure ring usually having rearwardly extending arms 9 extending through openings in the back plate to the rear side of the back plate. The pressure ring thrusts against the driven member 3 to press the same against the flywheel 1.

The spring means for engaging the clutch is here shown as an annular series of springs 10 interposed between the back plate 6 and the pressure ring 8. 11 is the throw-out collar suitably mounted to slide axially of the shaft 2 to engage and disengage the clutch.

12 are motion transmitting and multiplying clutch levers between the throw-out collar 11 and the pressure ring, these levers being here shown as of the first class fulcrumed short of their outer or resistance ends on the back plate and thrusting at their outer or resistance ends against shoulders provided on the rearwardly extending arms 9. These shoulders are here shown as the rear walls of notches 13 in the inner sides thereof toward the axis of the clutch. 14 designate fulcrums provided on the back plate to the inward of the arms 9. These fulcrums are here shown as projections on the back plate. More specifically, they are in the form of a bail or flattened U-shaped in general form, with the ends of the U formation secured to the back plate and their intermediate portions constituting fulcrums. The levers 12 are formed with transverse notches on their sides toward the back plate or the fulcrums for receiving the fulcrums, these notches being of less width than the width of the levers and located midway between the side edges of the levers, so that when the fulcrums are seated in the notches, the levers bear on the fulcrums on opposite sides of the notches, that is, beyond the opposite ends of the notches. The walls of the notches hold the levers from radial displacement when the levers are engaged with the fulcrums and at their outer or resistance ends with the rear walls of the notches 13 on the rearwardly extending arms of the pressure ring. Usually, each lever is bifurcated at its outer end, the bifurcations 12a extending astride the lateral sides of the arms 9. The levers 12 are channel-shaped in cross section and the fulcrums 14 are substantially the width of the channels, so that when the levers are assembled on the fulcrums, the side walls of the channels, coacting with the ends of the fulcrums, hold the levers from lateral displacement. The transverse notches in the levers are shown as formed by striking up opposing lugs 15 from the intermediate portion of the lever into positions at an angle to the lever.

The levers, because of the lugs 15, are hung on the fulcrums and would rattle and become displaced therefrom by relative pivotal movement about the resistance points at the outer ends of the levers. In order to hold the levers from displacement, due to shifting and pivotal movement about the resistance points, that is, to hold the levers from displacement from the fulcrums 14, springs are provided having bearing on the levers. As seen in Figure 1, the springs 16 are carried at the rear ends of the arms 9, are leaf springs anchored to the rear ends of the arms 9, as by screws 17, and press at their inner ends against the inner arms of the levers. The springs 16 tend to hold the levers from displacement off their fulcrums and also hold them from rattling and vibrating. Also, the springs or the inner ends thereof have an automatic follow-up movement, as the friction faces on the driven member 3 of the clutch wear. The shift of the levers under such wear is considerable. Also, the springs tend to offset the centrifugal action of the inner ends or arms of the levers and hold them off the bearing 16 of the throw-out collar, when the clutch is engaged.

The bifurcations 12ª at the outer ends of the levers are so located and of such length as to engage the back plate upon abnormal movement of the pressure ring 8 under the springs 10 (as when the back plate, pressure ring, etc., are detached from the flywheel 1), and cause the levers to bind on the bearing points 13 and hence prevent unintentional displacement of the levers off the fulcrums 14, or relieve the springs 16 of this duty.

Figure 3:
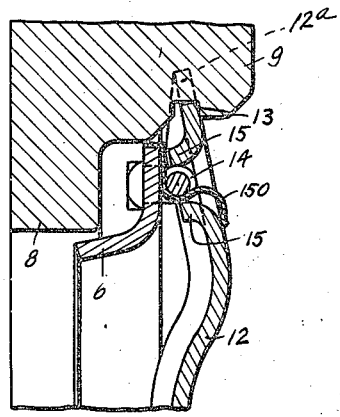
Figures 3 and 4 are detail fragmentary views of a modified form of spring means for the levers.
Figure 4:
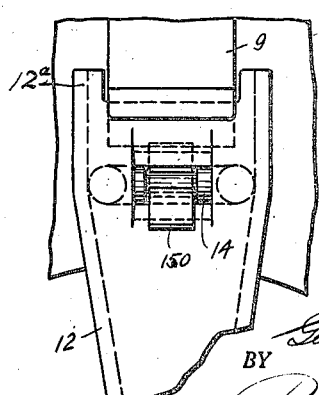

In Figures 3 and 4, another form of spring is used, this consisting of a leaf 150 bent to pass through the opening in the center of the lever or the bottom of the notches therein, part way around the fulcrum 14 and to the rear of the levers, and then into position to press against the inner ends of the arms 12. In this construction, the intermediate portions of the fulcrums are reduced to provide a space for the portions of the spring 150 passing around the fulcrum. In this form of the invention, no rivets or screws are necessary to hold the spring in assembled position. The fulcrum is reduced usually by turning down or forming a groove in the intermediate portion of the fulcrum, that is, the portion between the lugs 15.

Figure 5:
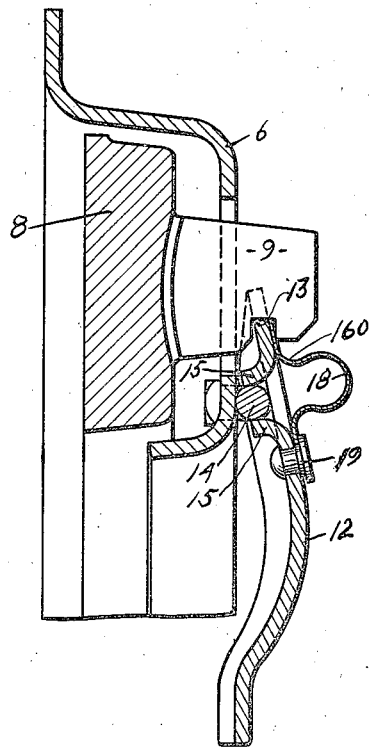
Figures 5 and 6 are views similar to Figures 3 and 4 of a second modification of the spring means of this clutch.
Figure 6:
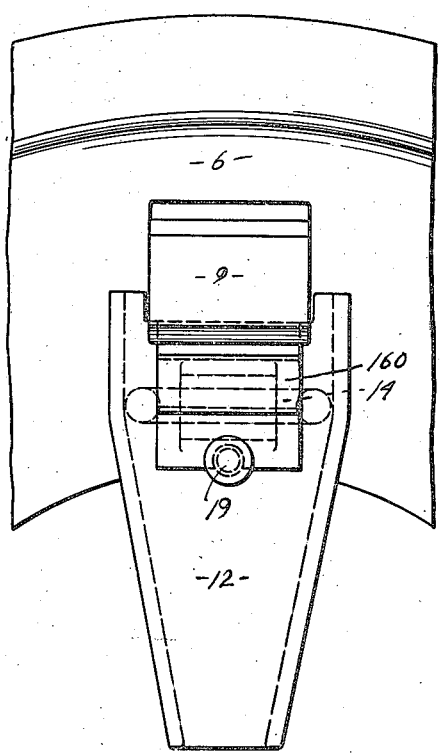

In Figures 5 and 6, a different form of spring is shown, this consisting of a spring 160 formed from flat stock to have an intermediate loop 18, the spring pressing at its opposite ends against the inner arm of the lever and at its upper end against the rear wall of the notch 13, it being here shown as anchored to the lower arm of the lever 12, as by rivets 19. The upper arm of this spring which extends into the notch 13 provides a hardened surface against which the upper resistance end of the lever works.

Figure 7:
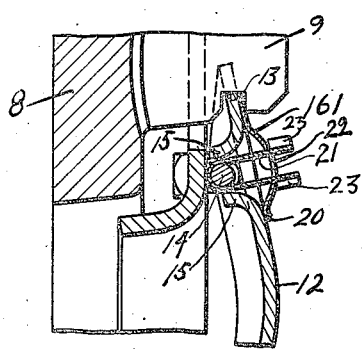
Figures 7 and 8 are views similar to Figures 3 and 4 of a third modification of the spring means of this clutch.
Figure 8:
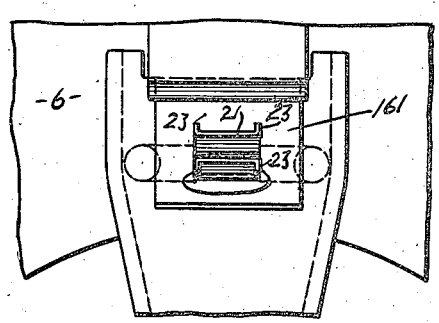

In Figures 7 and 8, a spring 161 is shown, this being formed up from a flat plate with its intermediate portion provided with a corrugation which causes the spring to act somewhat as a spring washer. The opposite ends of the spring thrust at 20 against the inner arm of the lever 12 without being anchored thereto and against the rear wall of the notch 13 providing a hard bearing face for the resistance end of the lever 12. The intermediate or bowed portion of the spring 161 is anchored to the fulcrum 14, as by a U-shaped clevis 21 extending between the lugs 15 and around the pivot 14, the arms of the clevis extending through an opening 22 in the bowed portion of the spring 161. The ends of the arms of the clevis have outwardly extending lugs 23 formed thereon, which interlock with the outer face of the bowed portion of the spring, when the spring is assembled on the clevis. The spring is assembled on the clevis by pinching the arms of the clevis together, then slipping the spring over the arms and releasing the arms so that they expand, moving the shoulders 23 into interlocking engagement with the bowed portion of the spring. The intermediate portion of the clevis frictionally engages the pivot 14 under the influence of the spring 161 and snubs the lever from vibration.

In any form of the invention, the springs 16, 150, 160 and 161 hold the levers from displacement from the fulcrum on the back plate and hold the levers from rattling. In all forms of the invention, the clutch levers are formed with transverse notches intermediate their side edges, which receive the fulcrums on the back plate, the fulcrums bearing on the levers beyond opposite ends of the notches.

What I claim is:

1. In a clutch, the combination with driving and driven members, a back plate having openings therein, a pressure ring rotatable with the driving member and having arms extending through the openings in the back plate, spring means pressing the pressure ring against the driven member to engage the clutch, a throw-out collar operable to disengage the clutch against the spring means and levers for transmitting the motion of the throw-out collar to the pressure ring; of the back plate being formed with projecting fulcrums and the pressure ring with shoulders against which the levers thrust at their outer ends, the clutch levers being formed with transverse notches intermediate of the side edges of the levers on the side thereof towards the back plate, for receiving the fulcrums and the end portions of the fulcrums bearing on the levers beyond the opposite ends of the notches, and spring means urging the levers toward the back plate to hold the levers on the fulcrums with the intermediate portions of the fulcrums in said notches, the spring means coacting with the levers eccentric to the fulcrums to also resist pivotal and vibrating movement of the levers.

2. In a clutch, the combination with driving and driven members, a back plate having openings therein, a pressure ring rotatable with the driving member and having arms extending through the openings in the back plate, spring means pressing the pressure ring against the driven member to engage the clutch, a throw-out collar operable to disengage the clutch against the spring means and levers for transmitting the motion of the throw-out collar to the pressure ring; of the back plate being formed with projecting fulcrums and the pressure ring with shoulders against which the levers thrust at their outer ends, the clutch levers being formed with transverse notches intermediate of the side edges of the levers on the side thereof towards the back plate for receiving the fulcrums and the end portions of the fulcrums bearing on the levers beyond the opposite ends of the notches, and spring means urging the levers toward the back plate to hold the levers on the fulcrums with the intermediate portions of the fulcrums in said notches, the spring means coacting with the levers eccentric to the fulcrums to also resist pivotal and vibrating movement of the levers, the levers being channel-shaped in general form with their channels toward the back plate and the fulcrums extending into the channels substantially the full width of the channels holding the levers from lateral displacement.

3. In a clutch, the combination with driving and driven members, a back plate having openings therein, a pressure ring rotatable with the driving member and having arms extending through the openings in the back plate, spring means pressing the pressure ring against the driven member to engage the clutch, a throw-out collar operable to disengage the clutch against the spring means and levers for transmitting the motion of the throw-out collar to the pressure ring; of the back plate being formed with projecting fulcrums and the pressure ring with shoulders against which the levers thrust at their outer ends, the clutch levers being formed with transverse notches intermediate of the side edges of the levers on the side thereof toward the back plate for receiving the fulcrums and the end portions of the fulcrums bearing on the levers beyond the opposite ends of the notches, and spring means urging the levers toward the back plate to hold the levers on the fulcrums with the intermediate portions of the fulcrums in said notches, the spring means coacting with the levers eccentric to the fulcrums to also resist pivotal and vibrating movement of the levers, the springs being carried by the rearwardly extending arms and extending inwardly therefrom and pressing against the inwardly extending arms of the levers.

4. In a clutch, the combination with driving and driven members, a back plate having openings therein, a pressure ring rotatable with the driving member and having arms extending through the openings in the back plate, spring means pressing the pressure ring against the driven member to engage the clutch, a throw-out collar operable to disengage the clutch against the spring means and levers for transmitting the motion of the throw-out collar to the pressure ring; of the back plate being formed with projecting fulcrums and the pressure ring with shoulders against which the levers thrust at their outer ends, the clutch levers being formed with transverse notches intermediate of the side edges of the levers on the side thereof towards the back plate for receiving the fulcrums and the end portions of the fulcrums bearing on the levers beyond the opposite ends of the notches, and spring means urging the levers toward the back plate to hold the levers on the fulcrums with the intermediate portions of the fulcrums in said notches, the spring means coacting with the levers eccentric to the fulcrums to also resist pivotal and vibrating movement of the levers, the levers being channel-shaped in general form with their channels toward the back plate and the fulcrums extending into the channels substantially the full width of the channels holding the levers from lateral displacement, the springs being carried by the rearwardly extending arms and extending inwardly therefrom and pressing against the inwardly extending arms of the levers.

5. In a clutch, the combination with driving and driven members, a back plate having openings therein, a pressure ring rotatable with the driving member and having arms extending through the openings in the back plate, spring means pressing the pressure ring against the driven member to engage the clutch, a throw-out collar operable to disengage the clutch against the spring means and levers for transmitting the motion of the throw-out collar to the pressure ring; of the back plate being formed with projecting fulcrums and the pressure ring with shoulders against which the levers thrust at their outer ends, the clutch levers being formed with transverse notches intermediate of the side edges of the levers on the side thereof toward the back plate for receiving the fulcrums and the end portions of the fulcrums bearing on the levers beyond the opposite ends of the notches, the transverse notches opening at their bottoms through the levers, and springs for urging the levers toward the back plate, one spring for each lever, each spring thrusting at one end against the back plate, extending through the open bottom of the notch part way around the fulcrum and then extending rearwardly of the lever and arched to press at its other end against the rear sides of the levers.

6. In a clutch, the combination with driving and driven members, a back plate having openings therein, a pressure ring rotatable with the driving member and having arms extending through the openings in the back plate, spring means pressing the pressure ring against the driven member to engage the clutch, a throw-out collar operable to disengage the clutch against the spring means and levers for transmitting the motion of the throw-out collar to the pressure ring; of the back plate being formed with projecting fulcrums and the pressure ring with shoulders against which the levers thrust at their outer ends, the clutch levers being formed with transverse notches intermediate of the side edges of the levers on the side thereof toward the back plate for receiving the fulcrums and the end portions of the fulcrums bearing on the levers beyond the opposite ends of the notches, the transverse notches opening at their bottoms through the levers, and springs for urging the levers toward the back plate, one spring for each lever, each spring thrusting at one end against the back plate, extending through the open bottom of the notch part way around the fulcrum and then extending rearwardly of the lever and arched to press at its other end against the rear sides of the levers, the fulcrums being formed with grooves through which the springs extend.

7. In a clutch, the combination with driving and driven members, a back plate having openings therein, a pressure ring rotatable with the driving member and having arms extending through the openings in the back plate, clutch spring means pressing the pressure ring against the driven member to engage the clutch, a throw-out collar operable to disengage the clutch against the spring means, and levers for transmitting the motion of the throw-out collar to the pressure ring; of fulcrums projecting from the back plate, and the arms of the pressure ring being formed with notches on their inner sides, the clutch levers being formed with open seats for receiving the fulcrums, each fulcrum coacting with its lever on opposite sides of the seat, the levers also having notches at their outer ends providing bifurcations extending on opposite sides of said arms, the bottoms of the notches in the levers seating on the bottoms of the notches in said arms and the levers thrusting on the rear walls of the notches in said arms, the bifurcations of the levers being of such length as to engage at their ends with the back plate when the inner ends of the levers have been moved outwardly a predetermined amount and thus lock the levers from further pivotal movement and hence the pressure ring from movement by the clutch spring means.

8. In a clutch, the combination with driving and driven members, a back plate having openings therein, a pressure ring rotatable with the driving member and having arms extending through the openings in the back plate, spring means pressing the pressure ring against the driven member to engage the clutch, a throw-out collar operable to disengage the clutch against the spring means and levers for transmitting the motion of the throw-out collar to the pressure ring; of the back plate being formed with projecting fulcrums, and the arms of the pressure ring with notches on the inner sides thereof toward the axis of the clutch for receiving the outer ends of the levers, the clutch levers being formed with transverse notches intermediate of their side edges on the side thereof toward the back plate for receiving the fulcrums and the end portions of the fulcrums bearing on the levers beyond the opposite ends of the transverse notches, and a spring, one for each lever, each spring having a bowed portion between its ends, the inner end of each spring thrusting against the inner arm of the adjacent lever and the outer end thrusting against the rear wall of one of said notches, the outer ends of the levers bearing on the ends of the springs in the notches.

9. In a clutch, the combination with driving and driven members, a back plate having openings therein, a pressure ring rotatable with the driving member and having arms extending through the openings in the back plate, spring means pressing the pressure ring against the driven member to engage the clutch, a throw-out collar operable to disengage the clutch against the spring means and levers for transmitting the motion of the throw-out collar to the pressure ring; of the back plate being formed with projecting fulcrums, and the arms of the pressure ring with notches on the inner sides thereof toward the axis of the clutch for receiving the outer ends of the levers, the clutch levers being formed with transverse notches intermediate of their side edges on the side thereof toward the back plate for receiving the fulcrums and the end portions of the fulcrums bearing on the levers beyond the opposite ends of the transverse notches, and a spring, one for each lever, each spring having a bowed portion between its ends, the inner end of each spring thrusting against the inner arm of the adjacent lever and the outer end thrusting against the rear wall of one of said notches, the outer ends of the levers bearing on the ends of the springs in the notches, the springs at their inner ends being anchored to the inner arms of the levers.

GEORGE T. JARRETT.